United States Patent
Kawasaki et al.

(10) Patent No.: US 7,120,124 B2
(45) Date of Patent: Oct. 10, 2006

(54) LOAD-DISTRIBUTION METHOD AND APPARATUS BASED ON THE METHOD

(75) Inventors: Takeshi Kawasaki, Kawasaki (JP); Hitoshi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 800 days.

(21) Appl. No.: 09/991,384

(22) Filed: Nov. 21, 2001

(65) Prior Publication Data

US 2002/0154601 A1    Oct. 24, 2002

(30) Foreign Application Priority Data

Apr. 23, 2001  (JP) .............................. 2001-124827

(51) Int. Cl.
*G01R 31/08* (2006.01)

(52) U.S. Cl. .................... 370/252; 370/412; 370/395.4

(58) Field of Classification Search ................ 370/229; 709/226, 227

See application file for complete search history.

(56) References Cited

U.S. PATENT DOCUMENTS 5,067,127 A * 11/1991 Ochiai ........................ 370/238
6,401,121 B1 * 6/2002 Yoshida et al. ............. 709/227
6,658,473 B1 * 12/2003 Block et al. ................ 709/226

FOREIGN PATENT DOCUMENTS

JP        4-81148      3/1992
JP     2000-13439     1/2000

* cited by examiner

*Primary Examiner*—Chau Nguyen
*Assistant Examiner*—Christopher Grey
(74) *Attorney, Agent, or Firm*—Katten Muchin Rosenman LLP

(57) ABSTRACT

A load-distribution method that transmits packets received from a network to two or more transmission destinations to distribute a load, comprising storing a weight value of distribution and an accumulated value according to actual transmission for every transmission destination, and transmitting the received packets, upon occurrence of a distribution event, to a transmission destination that has a smallest accumulated value.

9 Claims, 9 Drawing Sheets

LOAD-DISTRIBUTION METHOD AND APPARATUS BASED ON THE METHOD

BACKGROUND OF THE INVENTION

1. Field of the Invention

The present invention generally relates to a load-distribution method and apparatus therewith, and particularly relates to a load-distribution method and apparatus therewith for a processing server and a link between nodes in a network.

2. Description of the Related Art

With a rapid increase in an amount of packets transmitted or processed by the Internet, a potential packet transfer capacity which one link cannot transfer, and a potential packet processing capacity which one server cannot process have been required, which in turn calls for a load distribution of these packets over a plurality of links and servers for transfer and processing, respectively. Further, since transfer and processing capacities usually differ from link to link, and from server to server, respectively, it is necessary to distribute packets in proportion to their respective transfer and processing capacities.

Figure 1:
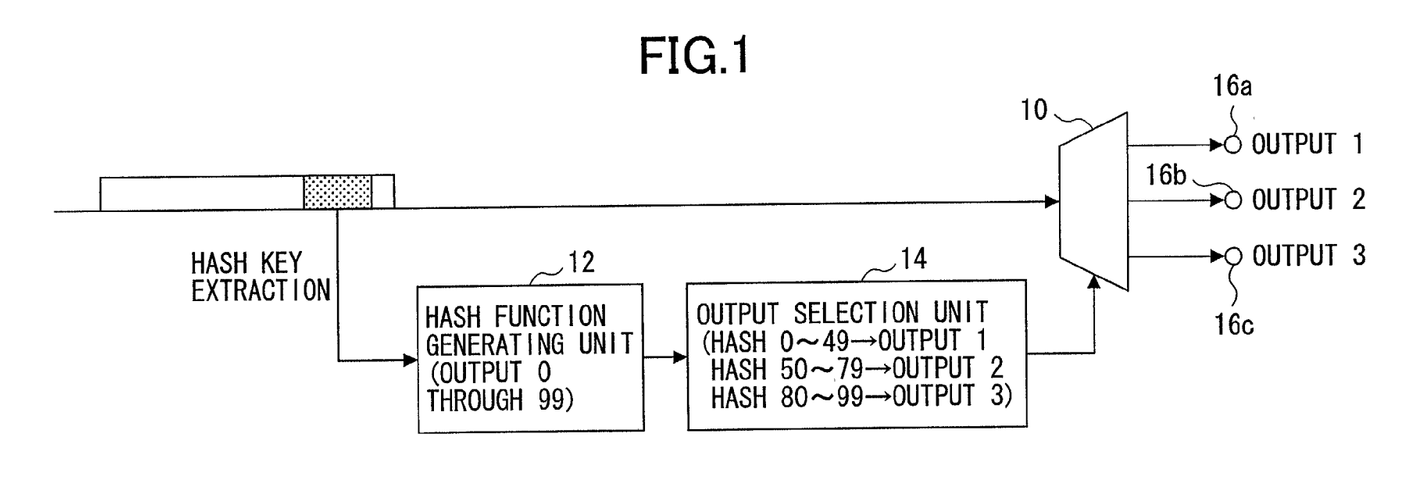
FIG. 1 is a block diagram of an example of a conventional load-distribution apparatus.
Figure 2:
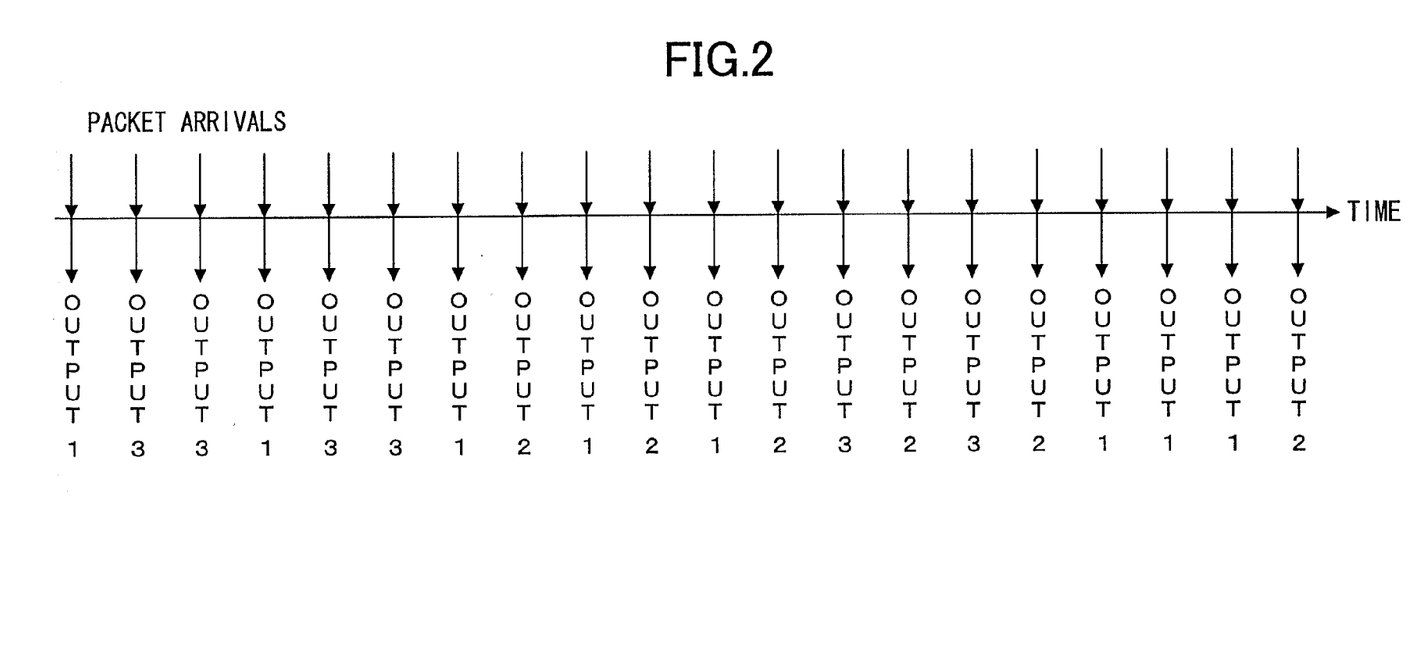
FIG. 2 shows how output terminals are selected with reference to FIG. 1.

FIG. 1 is a block diagram of an example of a conventional load-distribution apparatus, and FIG. 2 shows how output terminals are selected with reference to FIG. 1. In FIG. 1, a packet received from a network is supplied to a switch unit 10, and an address and the like of the packet are supplied to a Hash-function generating unit 12 as a key. The Hash-function generating unit 12 generates a random number between 0 and 99, for example, by applying the Hash function to this key, and supplies the number to the output selection unit 14. The output selection unit 14 is set up with predetermined weights such that when the random number falls between 0 and 49, for example, an output terminal 16a shall be selected, when the random number falls between 50 and 79, for example, an output terminal 16b shall be selected, and if the random number falls between 80 and 99, for example, an output terminal 16c shall be selected. The output selection unit 14 supplies a selection direction signal to the switch unit 10 according to the value from the Hash-function generating unit 12. The switch unit 10 switches the packet supplied according to this selection direction signal, and sends the packet to a link or server via one of the output terminals 16a, 16b, and 16c, which is assigned according to the weight.

Figure 3:
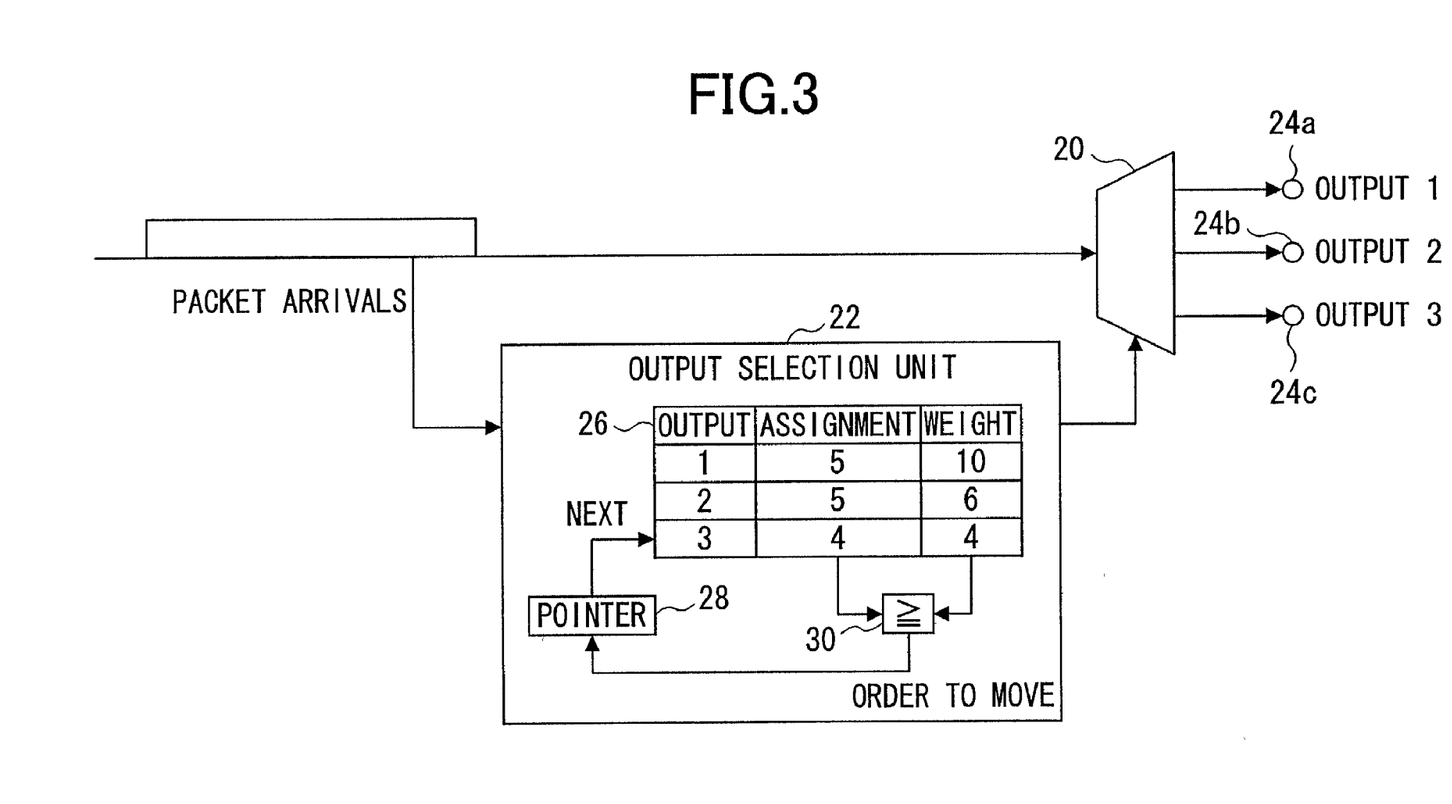
FIG. 3 is a block diagram of another example of the conventional load-distribution apparatus.
Figure 4:
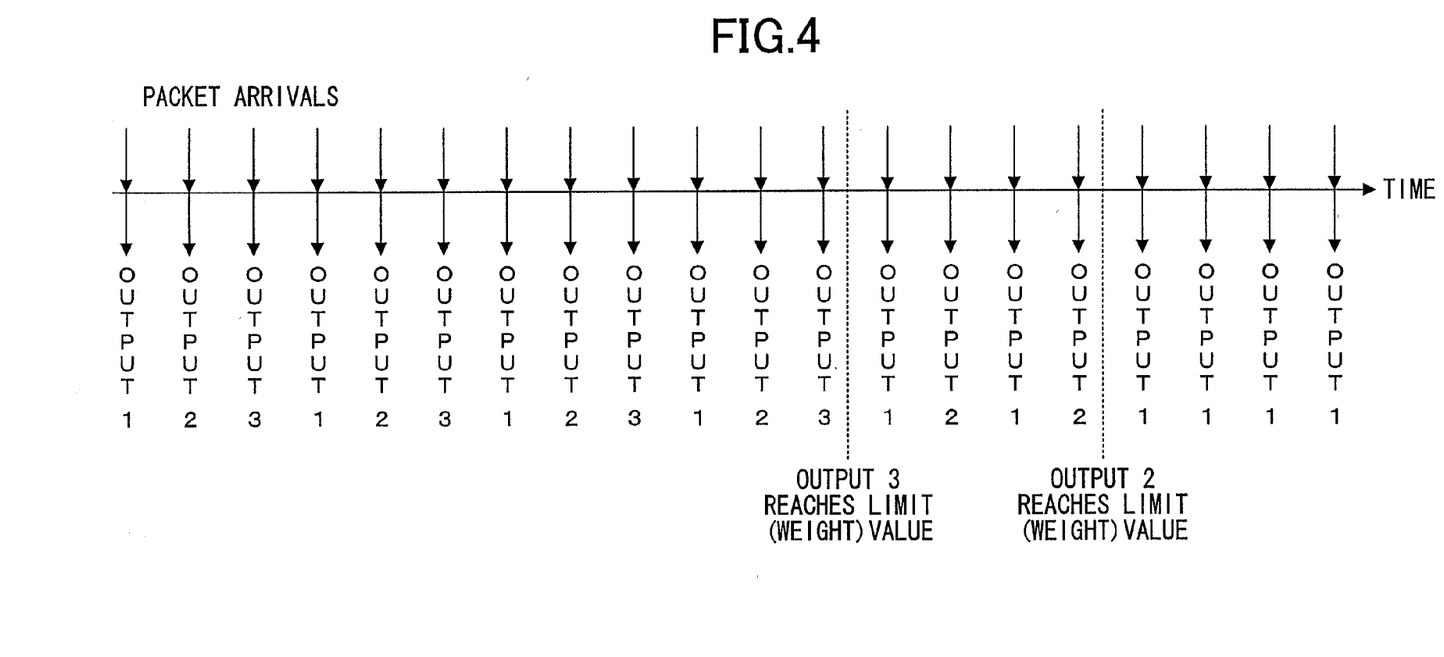
FIG. 4 shows how output terminals are selected with reference to FIG. 3.

FIG. 3 is a block diagram of another example of the conventional load-distribution apparatus, and FIG. 4 shows how output terminals are selected with reference to FIG. 3. In FIG. 3, a packet received from the network is supplied to a switch unit 20 and an output selection unit 22. The output selection unit 22 includes an output selection table 26 where a line is prepared for each of output terminals 24a, 24b, and 24c, each of which is given the number of assigned packets and weight value.

Whenever a packet is supplied, the output selection unit 22 searches a line which a pointer 28 in the output selection unit 22 indicates, reads the number of assigned packets and the weight value of the line that is pointed, and compares the number of the assigned packets with the weight value in a comparison unit 30. If the number of the assigned packets is found to be equal to or larger than the weight value, the comparison unit 30 directs the pointer 28 to move to the next line. If the number of the assigned packets is smaller than the weight value, the output selection unit 22 will supply a selection direction signal to the switch unit 20, which will select an output terminal corresponding to the line that is currently pointed to. The switch unit 20 switches the packet supplied according to this selection direction signal, and sends this packet to a link or server via one of the output terminals 24a, 24b, and 24c, assigned according to the weight.

In addition, when the number of assigned packets of all the lines of the table 22 becomes equal to or larger than the respective weight value, the number of assigned packets of all lines is reset to 0.

In the conventional practice described above using FIG. 1, the random number has unevenness that results from unevenness of the Hash function and the key. That requires counting a total of the number of packets assigned to a link or a server actually, and periodically adjusting a link or a server that is assigned to each random number obtained from the Hash function so that packets are assigned to each link or server according to the weight values.

Further, a problem has been that, even if the random number is truly random, unevenness is probable for a short period of time, and therefore, it takes a long period to achieve an adequate load distribution according to the weight.

In the conventional example as described with reference to FIG. 3, there has been a problem in that if the weight values differ greatly, packet assignment will be concentrated to a link or a server that has a large weight value after packet assignment to a link or a server having a small weight value is finished until the number of assigned packets is reset.

SUMMARY OF THE INVENTION

It is a general object of the present invention to provide an apparatus and a method that substantially obviate one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an apparatus and a method particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a load-distribution method that enables a packet to be transmitted to a link or a server in proportion to a weight value at arbitrary time as uniformly as possible, and an apparatus therewith.

The present invention realizes a packet transmission to each transmission destination in proportion to a weight value as uniformly as possible at any arbitrary time by storing the weight value of transmission distribution and an accumulated value corresponding to actual packet assignments for every transmission destination, and transmitting received packets, upon occurrence of a distribution event, to a transmission destination whose accumulated value is the smallest.

The present invention realizes a packet transmission to each transmission destination in proportion to a weight value as uniformly as possible at any arbitrary time by providing means for storing the weight value of transmission distribution and an accumulated value corresponding to actual packet assignments for every transmission destination, and transmitting received packets, upon occurrence of a distribution event, to a transmission destination whose accumulated value is the smallest.

The present invention can dispense with multiplication and division processes by adding up inverses of the weight value. Only an addition operation is performed before comparing the accumulated values of respective transmission destinations, allowing a high-speed distribution.

The present invention realizes a packet distribution that is as uniform as possible in proportion to the weight value according to a packet size of each transmitted packet by calculating the accumulated value by adding up products of an inverse of the above-mentioned weight value and the packet size.

The present invention realizes a packet distribution that is as uniform as possible in proportion to the weight values in accordance with a weight of process executed at each transmission destination by calculating the accumulated value by adding up products of an inverse of the weight values mentioned above and the weight of process executed in a session.

The present invention realizes a packet distribution that is as uniform as possible in proportion to the weight value according to a weight of file type of each packet transmitted by calculating the accumulated value by adding up products of an inverse of the weight values described above and the weight of the packet file type.

The present invention realizes a packet distribution that is as uniform as possible in proportion to the weight value for each packet by generating a distribution event upon receiving a packet.

The present invention realizes a packet distribution that is as uniform as possible in proportion to the weight values for each session by generating a distribution event upon start of a session.

The present invention realizes a high-speed distribution by sorting storing means by the above-mentioned accumulated values as a key, dispensing with comparison of the accumulated values for each transmission destination.

DESCRIPTION OF THE PREFERRED EMBODIMENTS

In the following, embodiments of the present invention will be described with reference to the accompanying drawings.

Figure 5:
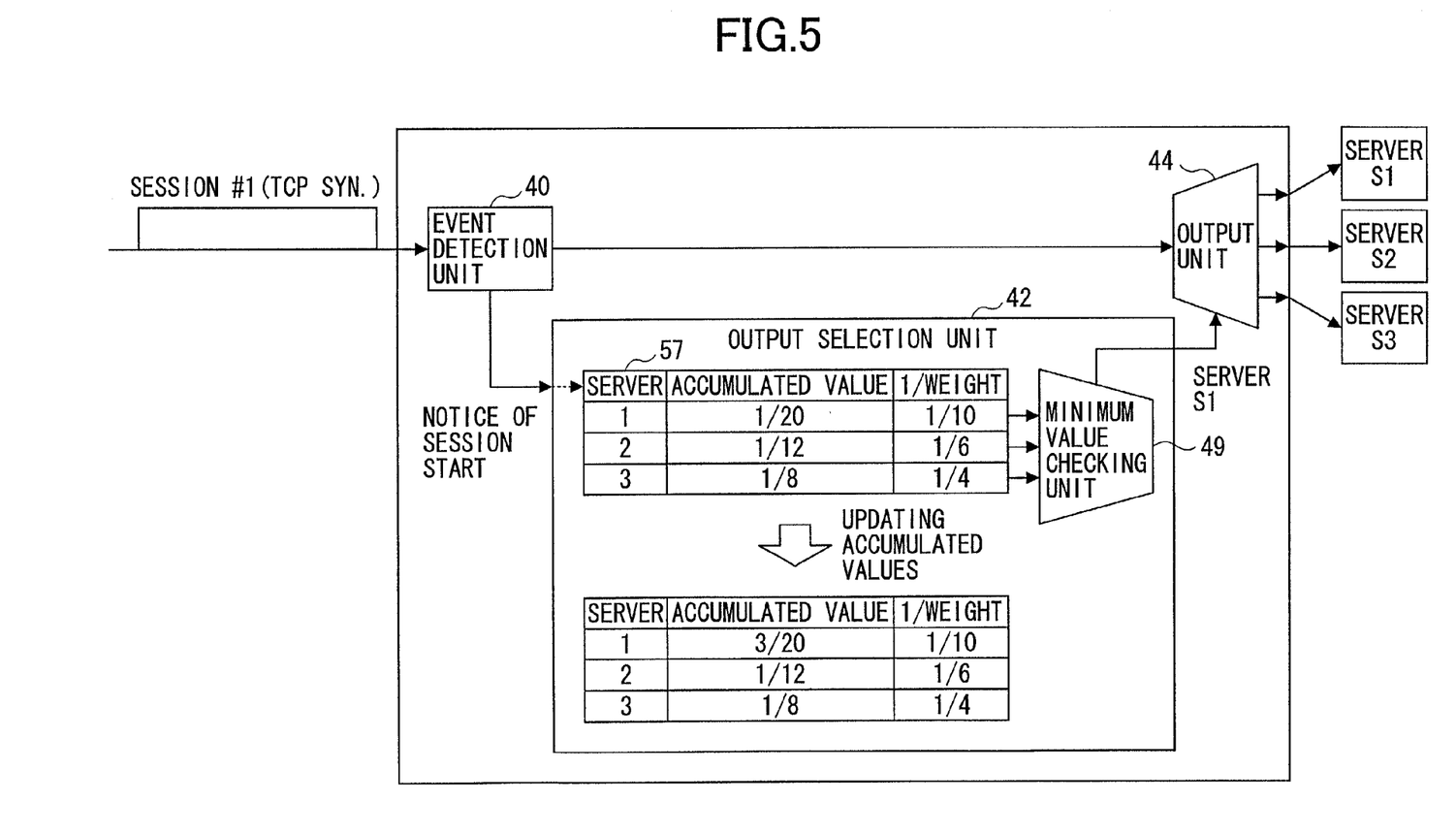
FIG. 5 is a block diagram of the first embodiment of the load-distribution apparatus of the present invention.

FIG. 5 is a block diagram of the first embodiment of a load-distribution apparatus of the present invention, which performs the load distribution based on the number of sessions assigned to processing servers in the Internet. In this embodiment, the load distribution is performed for every session. As shown in FIG. 5, a table 57 in an output destination selection unit 42 provides a line for each of servers S1, S2, and S3, as output destinations, each line providing an inverse of an accumulated value (the number of bytes) and an inverse of a weight value. Here, an example is presented, where the inverse of each weight value is set to $1/10$, $1/6$, and $1/4$, and the accumulation value is set to one half of the inverse of each weight value, i.e., $1/20$, $1/12$, and $1/8$, respectively.

As shown in FIG. 5, an event-detecting unit 40 detects a start of a session by a Syn packet or the like as a connection-establishment demand of the first TCP (Transmission Control Protocol), and notifies an output destination selection unit 42. In the output destination selection unit 42, a minimum value checking unit 49 compares an accumulated value of every server with an accumulated value of other servers. While the session is assigned to the server S1 that has the smallest accumulated value, the fact thereof is notified to an output unit 44, and $1/10$ which is the inverse of the weight value of the server S1 is added to the accumulated value of the server S1. The output unit 44 outputs the packet supplied from the event-detecting unit 40 to the server S1 that was assigned by the output destination selection unit 42.

Figure 6:
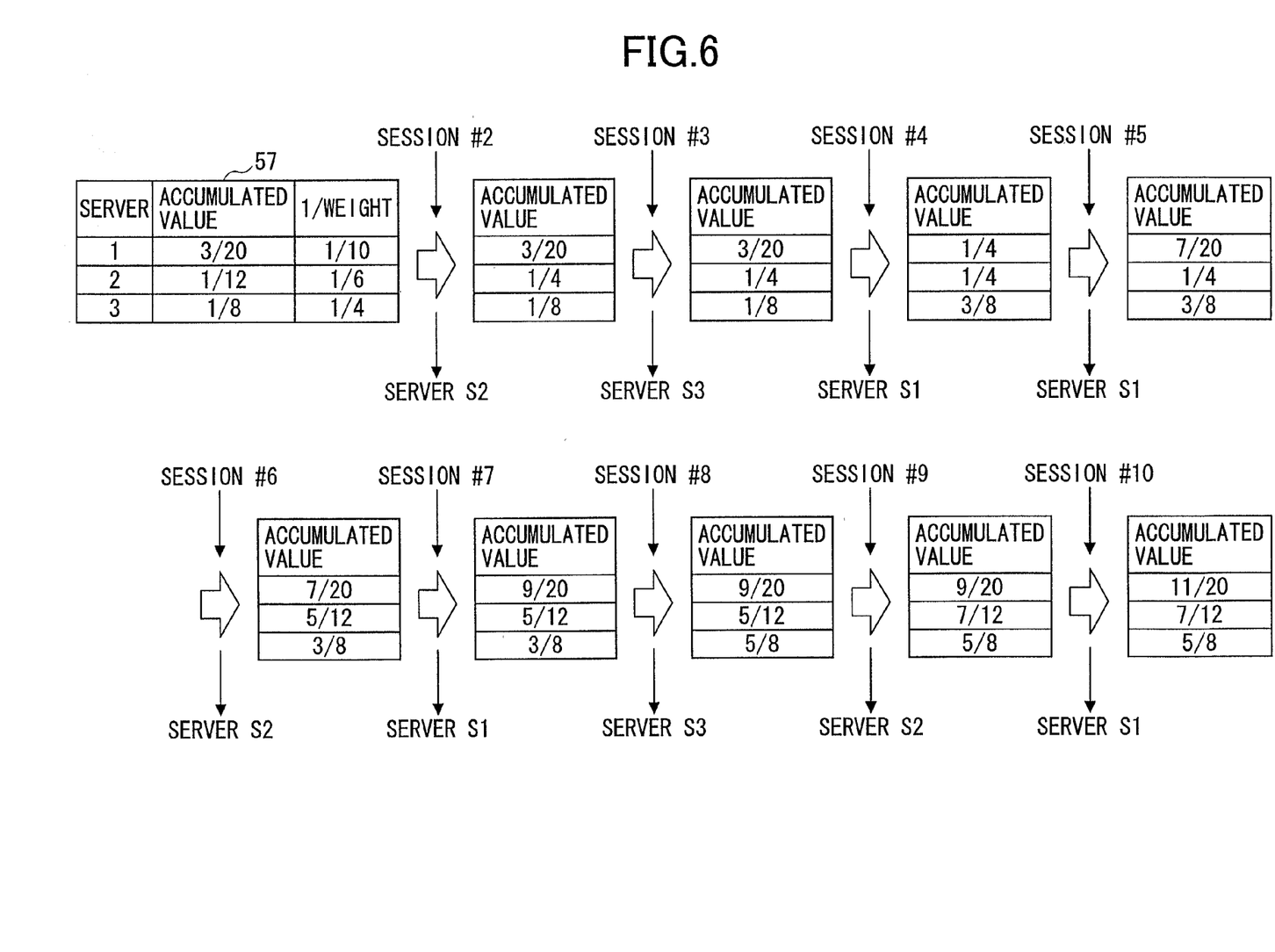
FIG. 6 shows how updating of an accumulated values is made as to each server in the first embodiment of the load-distribution apparatus of the present invention.

Henceforth, every time the event-detecting unit 40 detects the start of a session, the output destination selection unit 42 updates the accumulated value of each server, as shown in FIG. 6. Based on the accumulated value, a server is selected as the output destination. The output unit 44 transmits the packet to the applicable server. The number of sessions assigned to each server S1, S2, and S3 will become 5:3:2=10:6:4. FIG. 6 shows how the accumulated values for the servers in the table 57 are updated for each session. The weight value column is omitted in FIG. 6.

In the above-mentioned embodiment, only adding up is necessary before comparing the accumulated values with each other of the transmission destinations, dispensing with a need to perform either multiplication or division process. In this manner, a high-speed distribution can be performed by adding up the inverses of the weight value. Further, packets can be distributed as uniformly as possible in proportion to the weight value at the start timing of a session.

In addition, although initial values for the accumulated values were set to one half of the inverses of the weight value of each server in the above-mentioned embodiment, the initial values may be any values, including 0 and the inverse of the weight value.

Further, in this embodiment, the weight value in the output selection unit 42 may be further weighted according to an application (process) that is to take place upon starting the session at the event-detecting unit 40 that distinguishes the application. Here, if a packet is, for example, "http", an application weight of 2 is given, and if the packet is, for example, "ftp", an application weight of 1 is given. In this manner, the packet distribution can be made as uniform as possible in proportion to the weight value corresponding to a load of processing performed at each transmission destination.

Further, the output destination selection unit 42 may check a packet type. The output destination selection unit 42 distinguishes types of the packet, whether it is an image file, a text file, an animation file, or the like, instead of the application, and multiplies predetermined factors to the inverse of the weight values of the servers. For example, the file-type weight factor may be 50 for an image file, 5 for a text file, and 200 for an animation file. In this manner, the packet distribution can be made as uniformly as possible in proportion to the weight value according to the weight of the file type of each transmitted packet.

Furthermore, in the event detecting unit 40, the notice of an event is given to the output destination selection unit 42 for every reception of a packet, and the output destination selection unit 42 may be structured such that it adds up products of the inverse of the weight value for each server and a packet size of the packet received as the accumulated value. In this manner, the packet distribution can be made as uniformly as possible in proportion to the weight value according to the packet size of each transmitted packet.

Figure 7:
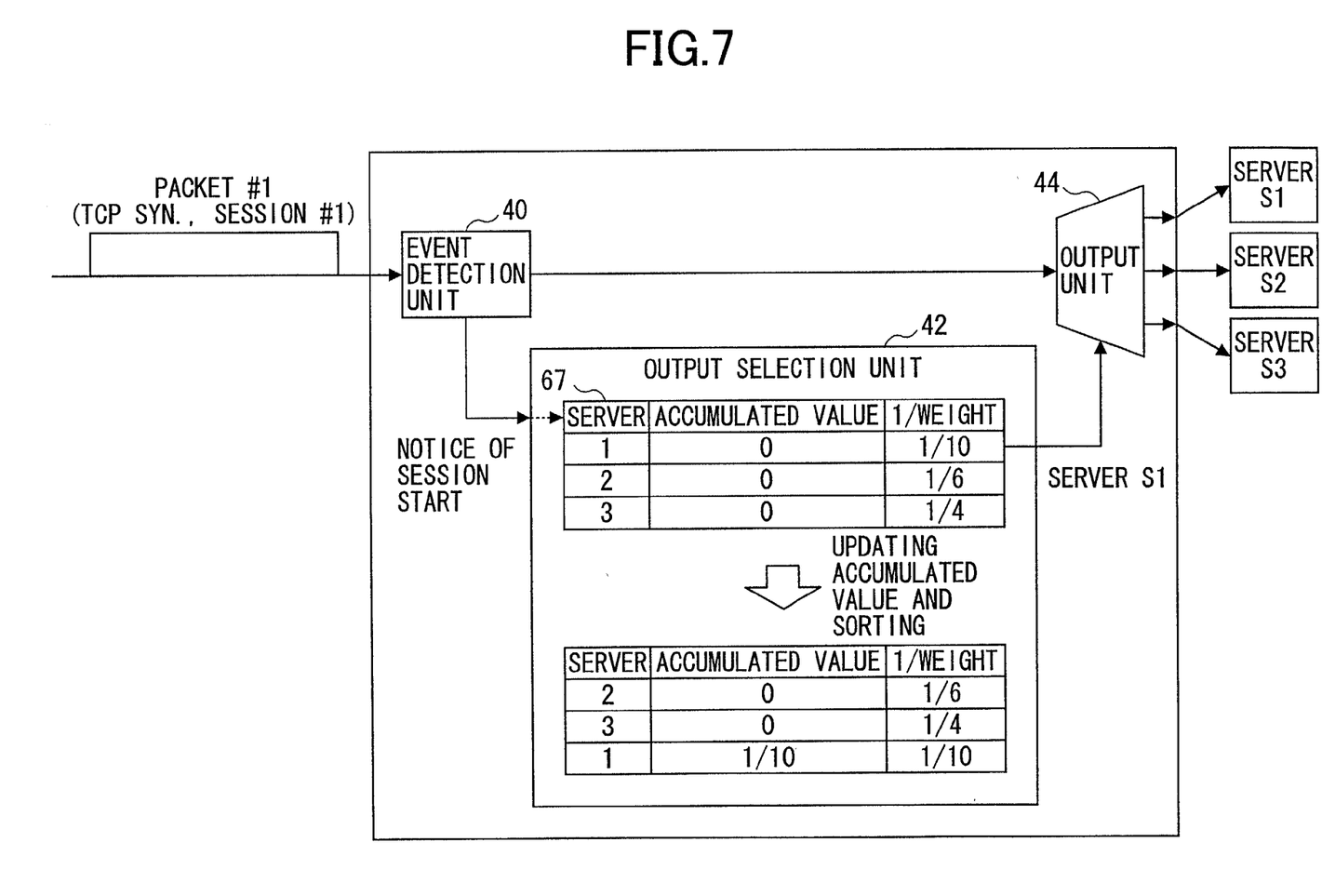
FIG. 7 is a block diagram of the second embodiment of the load-distribution apparatus of the present invention.

FIG. 7 is a block diagram of the second embodiment of the load-distribution apparatus of the present invention, which performs the load distribution based on the number of sessions assigned to processing servers in the Internet. In this embodiment, a load distribution is performed for every session. In FIG. 7, parts identical to parts in FIG. 5 bear the same reference numbers. A table 67 in the output destination selection unit 42 provides lines corresponding to the servers S1, S2, and S3 as output destinations, each line providing an inverse of an accumulated value (the number of bytes) and an inverse of a weight value. Here, an example is presented, where the inverse of each weight value is set to $\frac{1}{10}$, $\frac{1}{6}$, and $\frac{1}{4}$, respectively, and all of the accumulation values are set to 0. The table 67 includes a sorting facility to sort the lines in an ascending order of the accumulated values. The server number in the top line (indicative of the minimum accumulated value) is notified to the output unit 44.

As shown in FIG. 7, the event-detecting unit 40 detects the start of a session by the Syn packet of the first TCP or the like, and notifies the output destination selection unit 42. In the output destination selection unit 42, the session concerned is assigned to the server S1 in the top line, and the fact thereof is notified to the output unit 44. At the same time, $\frac{1}{10}$ which is the inverse of the weight value is added to the accumulated value of the server S1, and the accumulated value $\frac{1}{10}$ after addition is moved to a lower line through a bubble sorting procedure that compares the accumulated value with other lines until a bigger accumulated value than itself is found. In this manner, the table 67 is sorted such that the top line gives the smallest accumulated value. In the output unit 44, the packet supplied from the event-detecting unit 40 is outputted to the server S1 which was assigned by the output destination selection unit 42.

Figure 8:
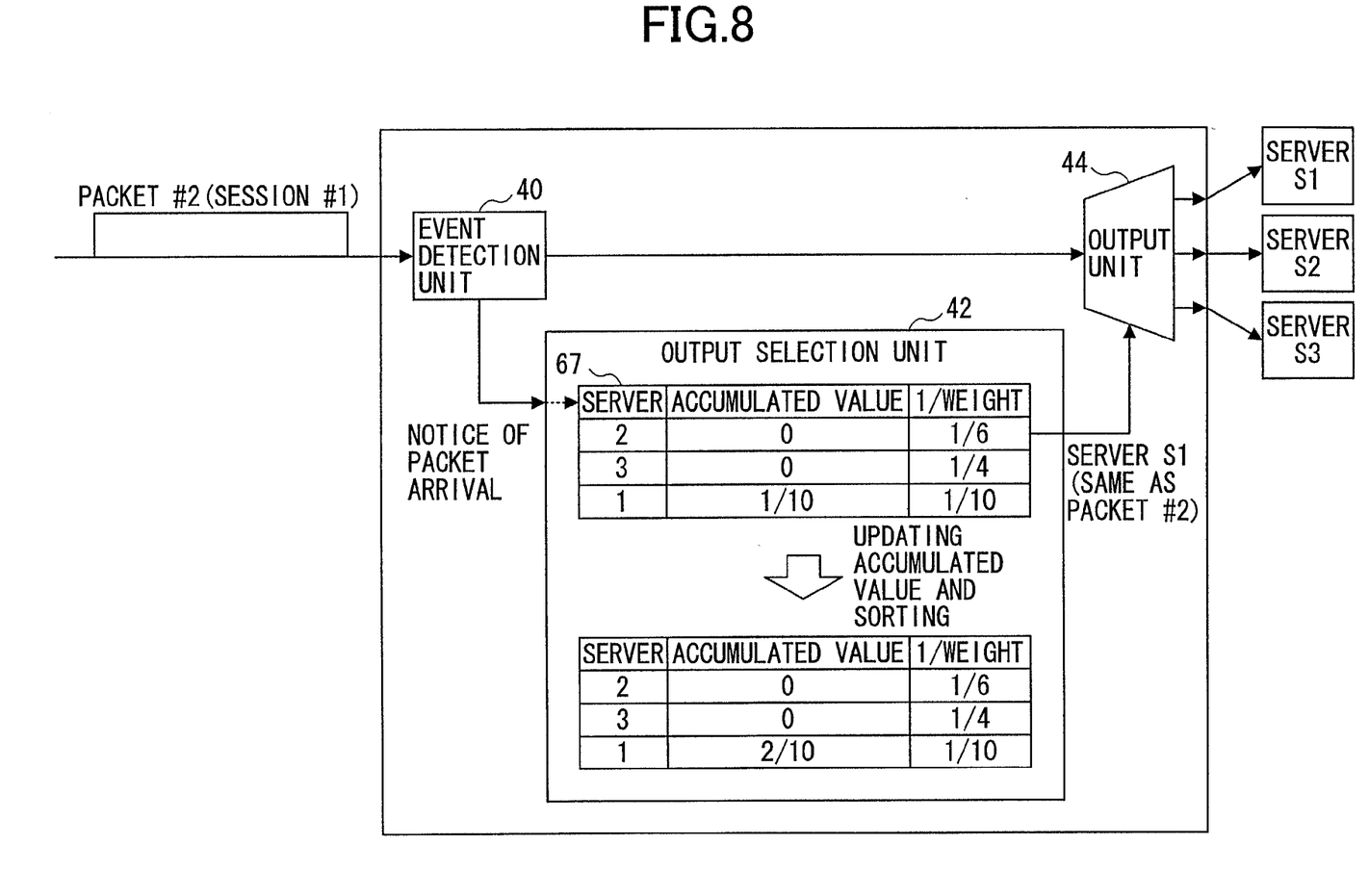
FIG. 8 shows how updating of an accumulated value is made as to each server in the second embodiment of the load-distribution apparatus of the present invention.

If a packet that belongs to the same session as the first packet arrives as the second packet as shown in FIG. 8, the event detecting unit 40 directs an addition of the accumulated value in the output destination selection unit 42 while transmitting the packet from the output unit 44 to the same server S1. In the output destination selection unit 42, the inverse of the weight, which is $\frac{1}{10}$, is added to the accumulated value of the server S1 of the table 67, and a further sorting is performed.

Figure 9:
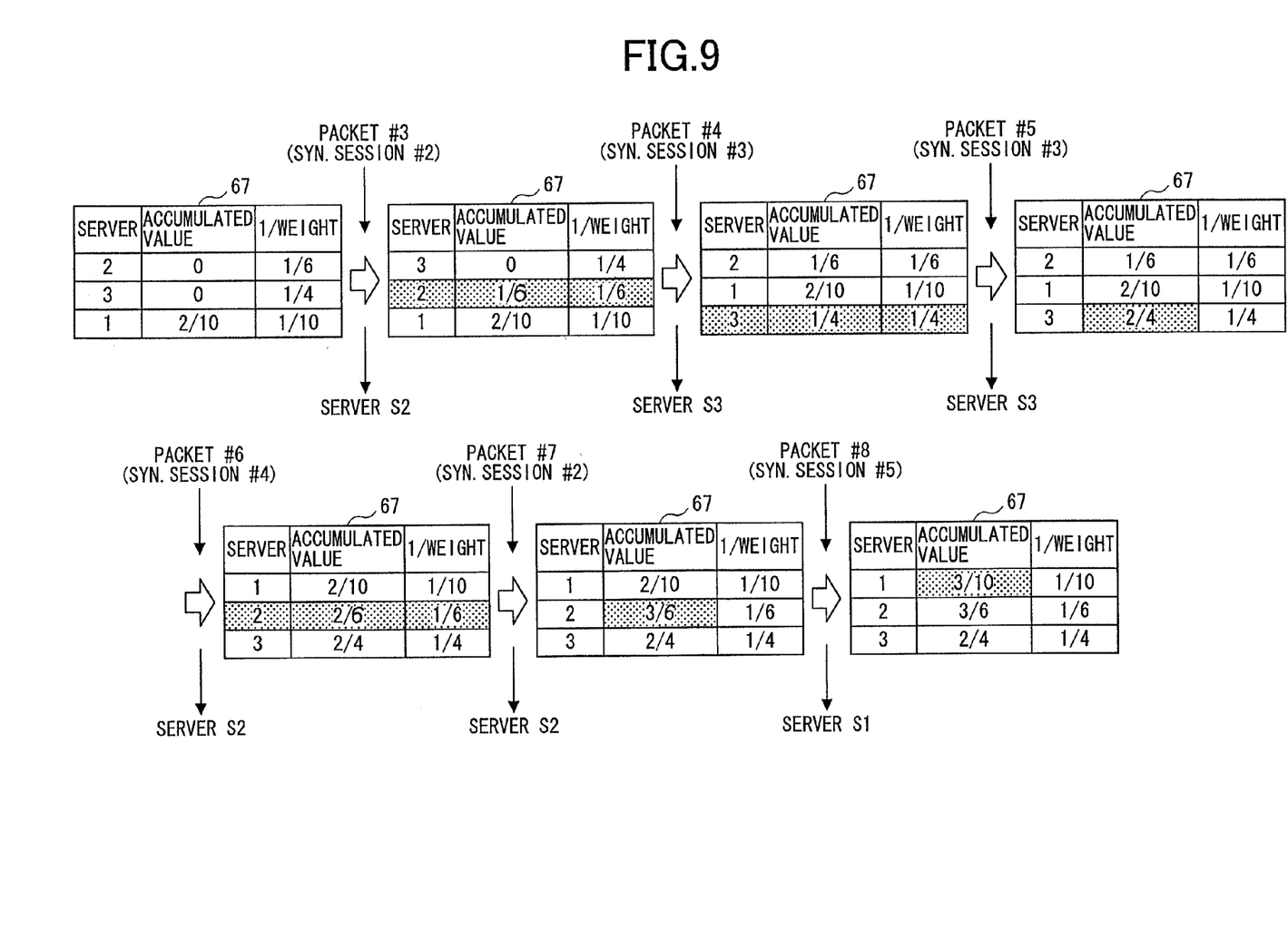
FIG. 9 shows how updating of an accumulated values is made as to each server in the second embodiment of the load-distribution apparatus of the present invention.

Henceforth, when the event detecting unit 40 detects a start of a new session, the output destination selection unit 42 selects the server S2 which has the minimum accumulated value as sorted in the table 67, and addition of the inverse of the weight to an accumulated value is performed, followed by sorting, as shown in FIG. 9. Further, upon arrival of packets belonging to an existing session, the packets are transmitted to the same server as the server handling the session, followed by performing only addition of the accumulated value and sorting in the output destination selection unit 42. In this manner, packets are transmitted to each server, session by session. And eventually, the ratio of the numbers of packets transmitted to the servers S1, S2, and S3 will become 10:6:4, respectively.

In this embodiment, since the table 67 is sorted such that the top line gives the minimum of the accumulated values, there is no need to compare accumulated values for every transmission destination, realizing a high-speed distribution.

Although the load distribution of the first and the second embodiments described above is performed based on the number of sessions assigned to the processing servers in the Internet, the load distribution method can be installed in a router of the Internet, and performed based on a total transfer packet size in a multi-link. In this case, whenever a packet arrives, for example, the event-detecting unit 40 notifies the packet arrival to the output selection unit 42 that selects a link as an output destination based on the accumulated value of each link, while updating the accumulated value of each link, and the output unit 44 transmits the packet to the selected link.

Here, the tables 57 and 67 correspond to the storing means described in claims, and the output destination selection unit 42 and the output unit 44 correspond to the distributing means.

Further, the present invention is not limited to these embodiments, but various variations and modifications may be made without departing from the scope of the present invention.

The present application is based on Japanese priority application No. 2001-124827 filed on Apr. 23, 2001, with the Japanese Patent Office, the entire contents of which are hereby incorporated by reference.

What is claimed is:

1. A load-distribution method that transmits packets received from a network to two or more transmission destinations to distribute a load, comprising:

storing a weight value of distribution and an accumulated value for each of the two or more transmission destinations, the accumulated value being updated by adding a value derived from said weight value to the accumulated value, upon occurrence of a distribution event; and transmitting the received packets, upon occurrence of the distribution event, to a transmission destination that has a smallest accumulated value.

2. A load-distribution apparatus that transmits packets received from a network to two or more transmission destinations to distribute a load, comprising:

storing unit which stores a weight value of distribution and an accumulated value for each of the two or more transmission destinations, the accumulated value being updated by adding value derived from said weight value to the accumulated value, upon occurrence of a distribution event; and distributing unit which transmits the received packets, upon occurrence of a distribution event, to the transmission destination that has a smallest accumulated value.

3. The load-distribution apparatus as claimed in claim 2, wherein inverses of said weight value are accumulated as said accumulated value by adding an inverse of said weight value to said accumulated value each time the distribution event occurs.

4. The load-distribution apparatus as claimed in claim 2, wherein products of inverses of said weight value and packet sizes are accumulated as said accumulated value by adding a product of an inverse of said weight value and a packet size to said accumulated value each time the distribution event occurs.

5. The load-distribution apparatus as claimed in claim 2, wherein products of inverses of said weight value and a weight of a process executed in a session are accumulated as said accumulated value by adding a product of an inverse of said weight value and the weight of the process executed in the session to said accumulated value each time the distribution event occurs.

6. The load-distribution apparatus as claimed in claim 2, wherein products of inverses of said weight value and a weight of packet file type are accumulated as said accumulated value by adding a product of an inverse of said weight value and the weight of packet file type to said accumulated value each time the distribution event occurs.

7. The load-distribution apparatus as claimed in claim 2, wherein said distribution event occurs upon receiving a packet.

8. The load-distribution apparatus as claimed in claim 2, wherein said distribution event occurs upon starting a session.

9. The load-distribution apparatus as claimed in claim 2, wherein said storing unit is sorted by said accumulated value as a key.

\* \* \* \* \*